(12) United States Patent
Tomita et al.

(10) Patent No.: US 6,921,176 B2
(45) Date of Patent: Jul. 26, 2005

(54) ILLUMINATING OPTICAL SYSTEM, IMAGE DISPLAY UNIT AND METHOD OF ILLUMINATING SPACE MODULATION ELEMENT

(75) Inventors: Hideo Tomita, Tokyo (JP); Masao Katsumata, Tokyo (JP); Hideki Yamamoto, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/483,469
(22) PCT Filed: May 14, 2003
(86) PCT No.: PCT/JP03/05980
§ 371 (c)(1), (2), (4) Date: Jan. 12, 2004
(87) PCT Pub. No.: WO03/096118
PCT Pub. Date: Nov. 20, 2003

(65) Prior Publication Data
US 2004/0196443 A1 Oct. 7, 2004

(30) Foreign Application Priority Data
May 14, 2002 (JP) ........................ 2002-139222

(51) Int. Cl.$^7$ ................... G03B 21/26; G02F 1/1335
(52) U.S. Cl. ............................. 353/94; 349/9
(58) Field of Search ............... 349/9; 353/85, 353/94; 362/231

(56) References Cited
U.S. PATENT DOCUMENTS 6,109,752 A * 8/2000 Itoh et al. .................. 353/98
6,252,636 B1 * 6/2001 Bartlett ....................... 348/743
6,273,589 B1 8/2001 Weber et al. ............... 362/293
6,348,997 B1 * 2/2002 Itoh ............................. 349/9
6,561,654 B2 * 5/2003 Mukawa et al. ............. 353/94
6,623,122 B1 * 9/2003 Yamazaki et al. ........... 353/94

FOREIGN PATENT DOCUMENTS

| JP | 2001-042431 | 2/2001 |
| JP | 2001-264697 | 9/2001 |
| JP | 2001-305656 | 11/2001 |

* cited by examiner

Primary Examiner—Christopher Mahoney
(74) Attorney, Agent, or Firm—Frommer Lawrence & Haug LLP; William S. Frommer; Thomas F. Presson

(57) ABSTRACT

Provided are an illumination optical system having superior color rendering properties while ensuring sufficient illuminance, an image display apparatus comprising the illumination optical system and a spatial modulation device illuminated by the illumination optical system, and a method of illuminating the spatial modulation device. A first light source (11), a second light source (21) having a different emission spectrum from an emission spectrum of the first light source (11), and a replacement optical system replacing light in a specific waveband in a luminous flux (L1) from the first light source (11) with a luminous flux (L2) from the second light source (21) are comprised, and the light in the specific waveband with weak light intensity in the luminous flux (L1) from the first light source (11) is replaced with the luminous flux (L2) with sufficient intensity from the second light source (21). Thereby, a white balance can be kept without reducing the illuminance more than necessary, and superior color rendering properties can be exhibited.

6 Claims, 8 Drawing Sheets

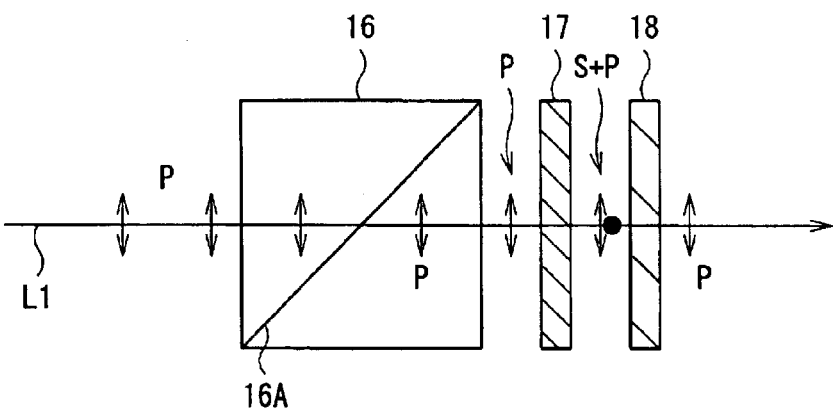
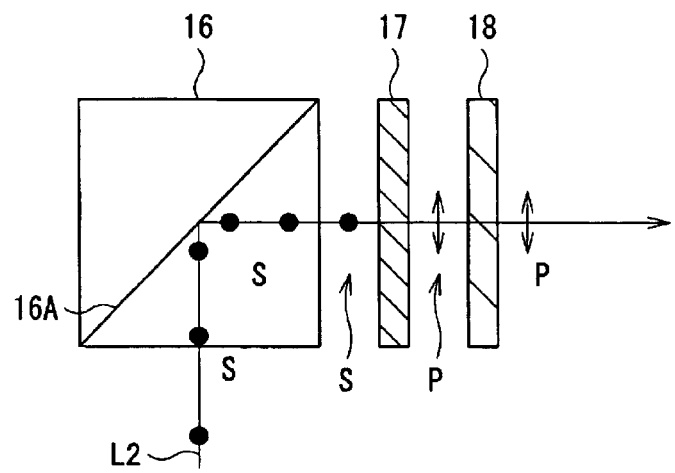

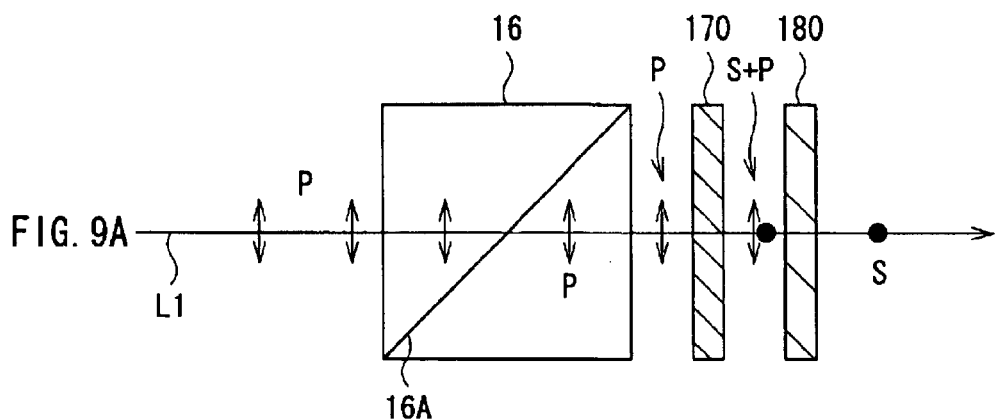
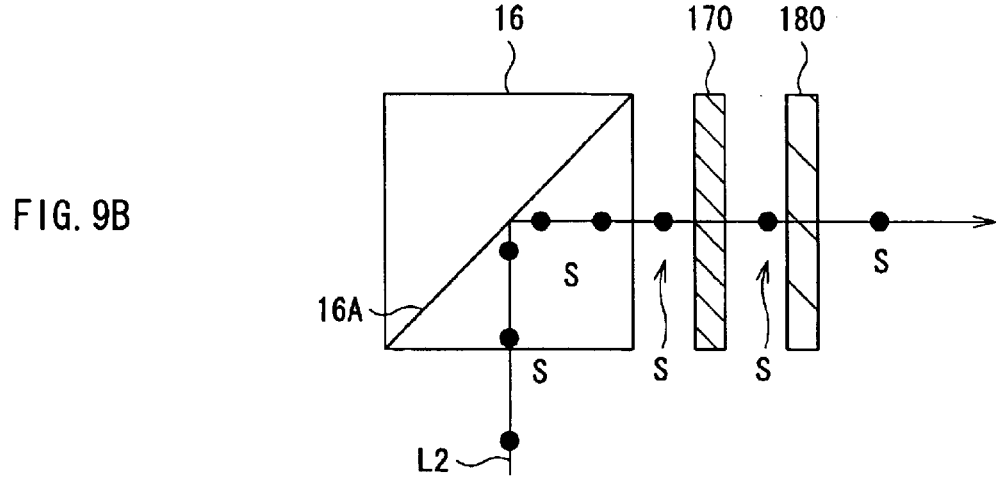

ILLUMINATING OPTICAL SYSTEM, IMAGE DISPLAY UNIT AND METHOD OF ILLUMINATING SPACE MODULATION ELEMENT

TECHNICAL FIELD

The present invention relates to an illumination optical system for illuminating an object in a balanced manner, an image display apparatus comprising such an illumination optical system and a spatial modulation device illuminated by the illumination optical system, and a method of illuminating such a spatial modulation device.

BACKGROUND ART

In recent years, for example, a projection type liquid crystal display apparatus using a spatial modulation device typified by a liquid crystal panel as an optical switching device, and magnifying and projecting an image on the liquid crystal panel on a screen by a projection optical system such as a liquid crystal projector or the like has been widely used. As the liquid crystal display apparatus of this kind, a single-panel system comprising one liquid crystal panel including three color filters of B (blue), R (red) and G (green), and a three-panel system comprising three monochrome liquid crystal panels for optical paths of B (blue), R (red) and G (green) are cited.

As a light source of an illumination optical system in such a projection type liquid crystal display apparatus, a metal halide lamp, a super high pressure mercury lamp or the like which has a continuous emission spectrum throughout the wavelength range of visible light is generally used.

FIG. 10 shows an emission spectrum of the super high pressure mercury lamp. As shown in FIG. 10, the emission spectrum of the super high pressure mercury lamp contains a few energy peaks. In the emission spectrum, light having an energy peak PB in a wavelength range of 400 nm to 480 nm is used as blue light, and light having an energy peak PG in a wavelength range of 490 nm to 550 nm is used as green light. Further, light in a wavelength range of 620 nm to 700 nm is used as red light.

However, as shown in FIG. 10, in such a super high pressure mercury lamp, compared to blue light and green light, the relative intensity of red light is considerably insufficient. Due to the insufficiency of a red light component, the white balance of a projected image finally obtained tends toward green and blue, so favorable color rendering properties cannot be obtained. Therefore, the intensities of a green light component and a blue light component are unavoidably reduced so as to adjust the white balance, thereby favorable color rendering properties are obtained. However, in such a method, the whole illuminance declines, thereby resulting in the occurrence of such a problem that the brightness of the projected image cannot be sufficiently obtained.

Further, the emission spectrum in FIG. 10 contains a yellow light component or an orange light component having a higher energy peak PY than the energy level of a red waveband in a wavelength range of around 580 nm. The presence of the yellow component or the orange component causes a problem in the color rendering properties of the projected image, such as changing the original color of the projected image which should be red to orange, or changing the original color of the projected image which should be green to yellow-green. In the case where the metal halide lamp is used, the problem occurs in a like manner.

In view of the foregoing, it is an object of the invention to provide an illumination optical system having superior color rendering properties while ensuring sufficient illuminance, an image display apparatus comprising such an illumination optical system and a spatial modulation device illuminated by the illumination optical system, and a method of illuminating such a spatial modulation device.

DISCLOSURE OF THE INVENTION

An illumination optical system according to the invention comprises: a first light source; a second light source having a different emission spectrum from an emission spectrum of the first light source; and a replacement optical system replacing light in a specific waveband in a luminous flux from the first light source with a luminous flux from the second light source. In this case, the luminous flux from the second light source preferably has an intensity peak in the above specific waveband, and when the specific waveband is a red waveband, a light-emitting diode or a red laser having a peak in the red waveband is preferably used as the second light source.

Moreover, the replacement optical system preferably includes a light synthesis device synthesizing and emitting a luminous flux incident from the first light source as a first linearly polarized luminous flux polarized in a first polarization direction and a luminous flux incident from the second light source as a second linearly polarized luminous flux polarized in a second polarization direction, a polarization rotating device selectively rotating only light polarized in the first polarization direction in the specific waveband in the luminous flux emitted from the light synthesis device to the second polarization direction and selectively rotating only light polarized in the second polarization direction in the specific waveband in the luminous flux emitted from the light synthesis device to the first polarization direction, and a polarizing device allowing only a linearly polarized luminous flux in the first polarization direction in the luminous flux emitted from the polarization rotating device pass through.

Conversely, the above-described replacement optical system may include a polarization rotating device selectively rotating only light polarized in the first polarization direction in a waveband other than the specific waveband in the luminous flux emitted from the light synthesis device to the second polarization direction and selectively rotating only light polarized in the second polarization direction in a waveband other than the specific waveband in the luminous flux emitted from the light synthesis device to the first polarization direction, and a polarizing device allowing only a linearly polarized luminous flux in the second polarization direction in the luminous flux emitted from the polarization rotating device pass through.

In the illumination optical system according to the invention, light in the specific waveband in the luminous flux from the first light source is replaced with the luminous flux from the second light source having a different emission spectrum from the emission spectrum of the first light source by the replacement optical system. Thereby, light in the specific waveband with weak light intensity in the luminous flux from the first light source can be replaced with the luminous flux with sufficient intensity from the second light source.

An image display apparatus according to the invention comprises: an illumination optical system, a spatial modulation device using a luminous flux emitted from the illumination optical system as illumination light, and carrying out selective spatial modulation on a pixel dot basis to form an optical image, wherein the illumination optical system comprises: a first light source, a second light source having a different emission spectrum from a wavelength spectrum of the first light source, and a replacement optical system replacing light in a specific waveband in a luminous flux from the first light source with a luminous flux from the second light source.

In the image display apparatus according to the invention, in the illumination optical system, light in the specific waveband in the luminous flux from the first light source is replaced with the luminous flux from the second light source having a different emission spectrum from an emission spectrum of the first light source by the replacement optical system. Thereby, light in the specific waveband with weak light intensity in the luminous flux from the first light source can be replaced with the luminous flux with sufficient intensity from the second light.

In a method of illuminating a spatial modulation device according to the invention, the spatial modulation device carries out selective spatial modulation on a pixel dot basis to form an optical image, and the method comprises the steps of: emitting a luminous flux from a first light source; emitting a luminous flux from a second light source having a different emission spectrum from an emission spectrum of the first light source; replacing light in a specific waveband in the luminous flux from the first light source with the luminous flux emitted from the second light source; and guiding the luminous flux from the first light source in a state where the light in the specific waveband is replaced with the luminous flux from the second light source to the spatial modulation device.

In the method of illuminating a spatial modulation device according to the invention, after light in the specific waveband in the luminous flux from the first light source is replaced with the luminous flux from the second light source having a different emission spectrum from an emission spectrum of the first light source, the luminous flux from the first light source is guided to the spatial modulation device. Thereby, light in the specific waveband with weak light intensity in the luminous flux from the first light source can be replaced with the luminous flux with sufficient intensity from the second light source.

BRIEF DESCRIPTION OF THE DRAWINGS

FIGS. 7A and 7B are sectional views showing polarization directions of incident luminous fluxes in a PS separation/synthesis device shown in FIG. 1;

FIGS. 9A and 9B are sectional views of another embodiment of a polarization rotating device and a polarizing plate shown in FIGS. 7A and 7B.

BEST MODE FOR CARRYING OUT THE INVENTION

Preferred embodiments of the present invention are described in more detail below referring to the accompanying drawings.

At first, referring to FIG. 1, the structure of a liquid crystal display apparatus as an image display apparatus according to an embodiment of the invention will be described below. In the embodiment, "front" means a side closer to a light source when viewed from an object, and "back" means a side opposite to the light source when viewed from the object.

Figure 1:
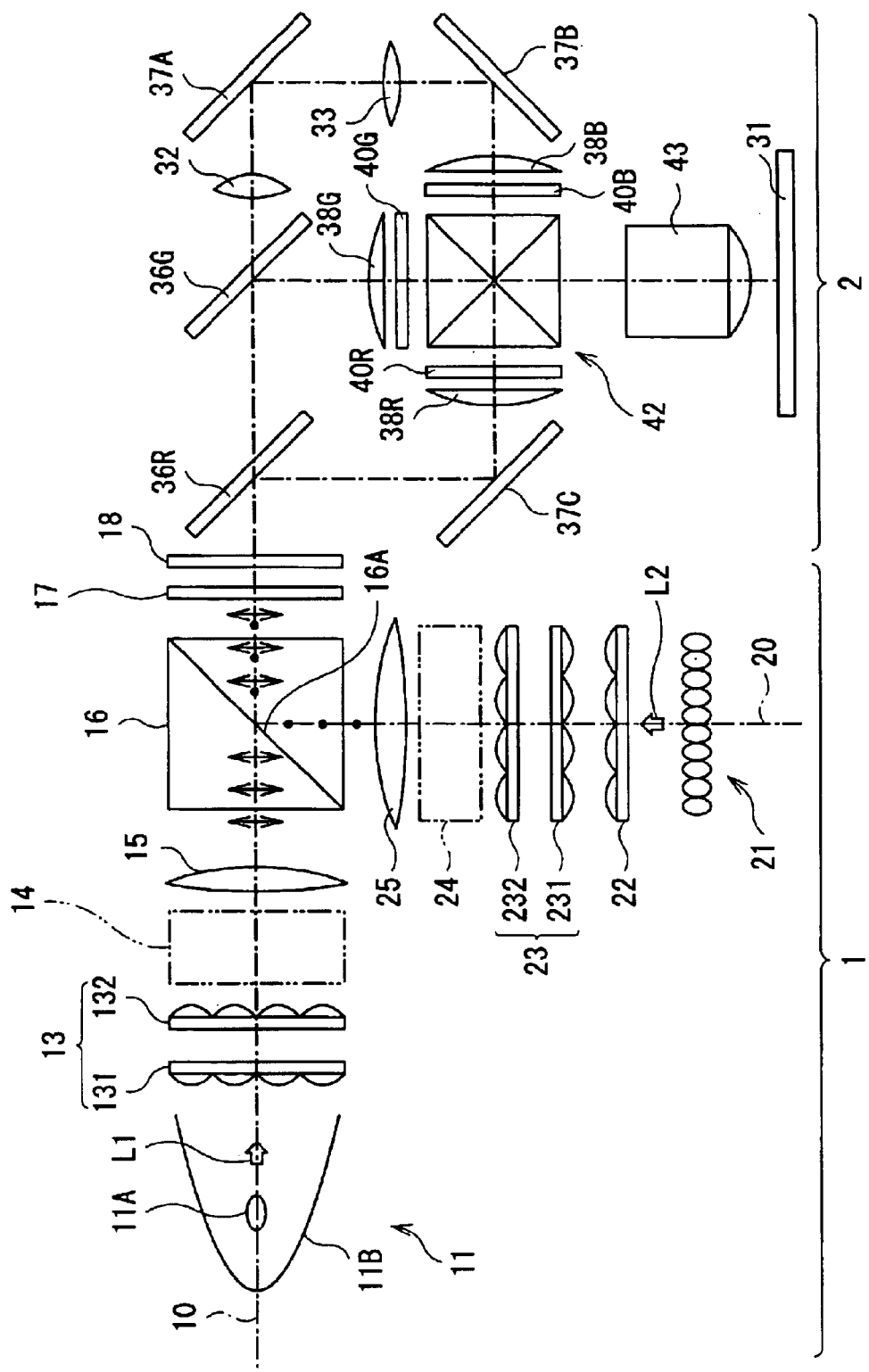
FIG. 1 is a schematic plan view of a projection type liquid crystal display apparatus according to an embodiment of the invention.

FIG. 1 shows a schematic view of the liquid crystal display apparatus according to the embodiment when viewed from directly above or side. The liquid crystal display apparatus is a three-panel system projection type color liquid crystal display apparatus, and comprises a first optical system 1 and a second optical system 2.

The first optical system 1 includes a first light source 11, a second light source 21 and a PS separation/synthesis device 16. A central axis 10 (hereinafter referred to as an optical axis 10) of a luminous flux from the first light source 11 and a central axis 20 (hereinafter referred to as an optical axis 20) of a luminous flux from the second light source 21 are substantially orthogonal to each other, and the PS separation/synthesis device 16 is disposed in a position where the optical axes 10 and 20 intersect with each other.

The first optical system 1 further includes a fly-eye lens portion 13, a polarization converting device 14 and a condenser lens 15 which are disposed between the first light source 11 and the PS separation/synthesis device 16 along the optical axis 10 in order from the first light source 11. The first optical system 1 further includes a collimator lens 22, a fly-eye lens portion 23, a polarization converting device 24 and a condenser lens 25 which are disposed between the second light source 21 and the PS separation/synthesis device 16 along the optical axis 20 in order from the second light source 21. The first optical system 1 further includes a polarization rotating device 17 and a polarizing plate 18 which are disposed in order along the optical axis 10 at the back of the PS separation/synthesis device 16.

Herein, the first optical system 1 corresponds to a specific example of "an illumination optical system" in the invention. Moreover, an optical system including the polarization converting devices 14 and 24, the PS separation/synthesis device 16, the polarization rotating device 17 and the polarizing plate 18 corresponds to a specific example of "a replacement optical system" in the invention. Further, the polarization converting device 14 corresponds to a specific example of "a first polarization converting means" in the invention, and the polarization converting device 24 corresponds to a specific example of "a second polarization converting means" in the invention. The PS separation/synthesis device 16 corresponds to a specific example of "a light synthesis device" in the invention, and the polarization rotating device 17 corresponds to a specific example of "a polarization rotating device" in the invention, and the polarizing plate 18 corresponds to a specific example of "a polarizing device" in the invention.

The first light source 11 includes a luminous body 11A and a concave mirror 11B with rotational symmetry. As the luminous body 11A, for example, a super high pressure mercury lamp having a continuous emission spectrum throughout the wavelength range of visible light is used. Alternatively, for example, a metal halide lamp may be used. The concave mirror 11B preferably has a shape with as high condensing efficiency as possible, so, for example, a spheroidal mirror is preferable. As the second light source 21, a light-emitting diode (LED) or a red laser having a different emission spectrum from the emission spectrum of the first light source 11, and having a peak in a specific waveband, that is, a red waveband W (for example, ranging from 620 nm to 700 nm, and more preferably from 625 nm to 645 nm) is used (refer to FIG. 8B which will be described later).

The collimator lens 22 has a function of converting a luminous flux emitting from the second light source 21 into a luminous flux substantially parallel to the optical axis 20.

The fly-eye lens portion 13 includes a first lens array 131 and a second lens array 132 disposed between the polarization converting device 14 which is a part of the replacement optical system and the first light source 11 in order from the first light source 11, and corresponds to a specific example of "a first uniformization optical system" in the invention. The fly-eye lens portion 23 includes a third lens array 231 and a fourth lens array 232 disposed between the polarization converting device 24 which is another part of the replacement optical system and the second light source 21 in order from the second light source 21, and corresponds to a specific example of "a second uniformization optical system" in the invention. The fly-eye lens portions 13 and 23 function as integrators for diffusing luminous-fluxes emitted from the first light source 11 and the second light source 21 to uniform an in-plane illuminance distribution in liquid crystal panels 40R, 40G and 40B (hereinafter generically referred to as "liquid crystal panel 40" as necessary) which will be described later. The fly-eye lens portion 13 will be described in more detail later.

The polarization converting device 14 has a function of converting a luminous flux from the first light source 11 into a first linearly polarized luminous flux (P-polarized luminous flux) polarized in a first polarization direction, and the polarization converting device 24 has a function of converting a luminous flux from the second light source 21 into a second linearly polarized luminous flux (S-polarized luminous flux) polarized in a second polarization direction orthogonal to the first polarization direction. Herein, the P-polarized luminous flux means a linearly polarized luminous flux in which a vibration direction of an electric vector of light entered into a targeted sample plane is included in a plane of incidence (a plane including a normal line stood in a position where a beam is entered, and an incident beam), and the S-polarized luminous flux means a linearly polarized luminous flux in which a vibration direction of an electric vector is in a plane orthogonal to the plane of incidence. The polarization converting devices 14 and 24 will be described in more detail later.

The condenser lenses 15 and 25 condense a plurality of small luminous fluxes emitted from the polarization converting devices 14 and 24, respectively. The condenser lenses 15 and 25 may be disposed on an emission side of the PS separation/synthesis device 16.

The PS separation/synthesis device 16 synthesizes the first linearly polarized luminous flux and the second linearly polarized luminous flux with a low loss, and includes two prisms bonded with a separation/synthesis surface 16A where a polarization separation/synthesis film is formed in between. The PS separation/synthesis device 16 performs functions of passing the first linearly polarized luminous flux which is the P-polarized luminous flux therethrough with hardly any loss, and reflecting the second linearly polarized luminous flux which is the S-polarized luminous flux on the separation/synthesis surface 16A with hardly any loss.

The polarization rotating device 17 is a polarization rotating device having wavelength selectivity which rotates the polarization direction of only light in the above-described specific waveband (red waveband W) in an incident luminous flux by 90 degrees, and allowing light in the other waveband pass through without rotation. Therefore, in the first linearly polarized luminous flux entered from the first light source 11 into the polarization rotating device 17, the polarization direction of only light in the above-described waveband is selectively rotated from the first polarization direction (P-polarization direction) to the second polarization direction (S-polarization direction).

On the other hand, in the second linearly polarized luminous flux entered from the second light source 21 into the polarization rotating device 17, the polarization direction of only light in the above-described specific waveband is selectively rotated from the second polarization direction (S-polarization direction) to the first polarization direction (P-polarization direction). Herein, when the above-described specific waveband is a red waveband (for example, ranging from 620 nm to 700 nm) substantially equivalent to the emission spectrum band of the second light source 21, in the second linearly polarized luminous flux from the second light source 21, the polarization directions of all wavelength components in the second linearly polarized luminous flux from the second light source 21 are rotated to the P-polarization direction.

As the polarization rotating device 17 having such wavelength selectivity, for example, "ColorSelect" of ColorLink Inc. can be used.

The polarizing plate 18 allows only a linearly polarized luminous flux polarized in the first polarization direction (P-polarization direction) in linearly polarized luminous fluxes emitted from the polarization rotating device 17 pass through. The description about this will be given later.

The second optical system 2 includes dichroic mirrors 36R and 36G disposed in order along the optical axis 10 at the back of the polarizing plate 18 with a predetermined space, a reflective mirror 37A disposed on the optical axis at the back of the dichroic mirror 36G, a reflective mirror 37B disposed on an axis passing through the center of the reflective mirror 37A and being orthogonal to the optical axis 10, and a reflective mirror 37C disposed on an axis passing through the center of the dichroic mirror 36R and being orthogonal to the optical axis 10.

The dichroic mirrors 36R and 36G have a function of separating a white luminous flux emitted from the polarizing plate 18 into color component lights of R (red) and G (green) which are fundamental color displays, and reflecting the color component lights in a direction orthogonal to the incident direction. The reflective mirror 37A reflects a blue component light, which is a remaining color component after separating from red and green components by passing through the dichroic mirrors 36R and 36G, in a direction orthogonal to the incident direction, and the reflective mirror 37B further reflects the blue component light reflected on the reflective mirror 37A in a direction orthogonal to the incident direction. The reflective mirror 37C reflects the red component light separated by and reflected on the dichroic mirror 36R in a direction orthogonal to the incident direction.

The second optical system 2 further includes condenser lenses 38R, 38G and 38B disposed in a direction where each light reflected on the reflective mirrors 37A, 37B and 37C travels, respectively, and liquid crystal panels 40R, 40G and 40B disposed on emission sides of the condenser lenses 38R, 38G and 38B, respectively. The condenser lenses 38R, 38G and 38B condense component lights of red, green and blue separated by the dichroic mirrors 36R and 36G, and a polarization filter (not shown) for converting the incident light into more perfect linear polarization is disposed on each of the emission sides of the condenser lenses 38R, 38G and 38B. The liquid crystal panels 40R, 40G and 40B have a function of modulating the polarization direction of each color component light passed through the condenser lenses 38R, 38G and 38B on a pixel dot basis according to each image to be displayed. Herein, the liquid crystal panel 40 corresponds to a specific example of "a spatial modulation device" in the invention.

The second optical system 2 still further includes a dichroic prism for color synthesis 42 disposed in a position where an axis passing through the centers of the dichroic mirror 36G and the liquid crystal panel 40G and an axis passing through the centers of the liquid crystal panels 40R and 40B intersect with each other, and a projection lens 43 disposed on an emission side of the dichroic prism for color synthesis 42 (that is, on an axis passing through the centers of the dichroic mirror 36G and the liquid crystal panel 40G and on a side opposite to the liquid crystal panel 40G). The dichroic prism for color synthesis 42 synthesizes color component lights having passed through the liquid crystal panel 40R, 40G and 40B and emits synthesized light, and the projection lens 43 condenses and projects the synthesized light emitted from the dichroic prism for color synthesis 42 on a screen 31.

Moreover, a condenser lens 32 is disposed between the dichroic mirror 36G and the reflective mirror 37A, and a condenser lens 33 is disposed between the reflective mirror 37A and the reflective mirror 37B. The condenser lenses 32 and 33 are disposed in consideration of a fact that an optical path length to the liquid crystal panel 40B corresponding to the blue component light is longer than optical path lengths corresponding to the red component light and the green component light, so it is easier for the blue component light to be dispersed. Thereby, the blue component light is further condensed, so the intensity of the blue component light can be prevented from being declined.

Figure 2:
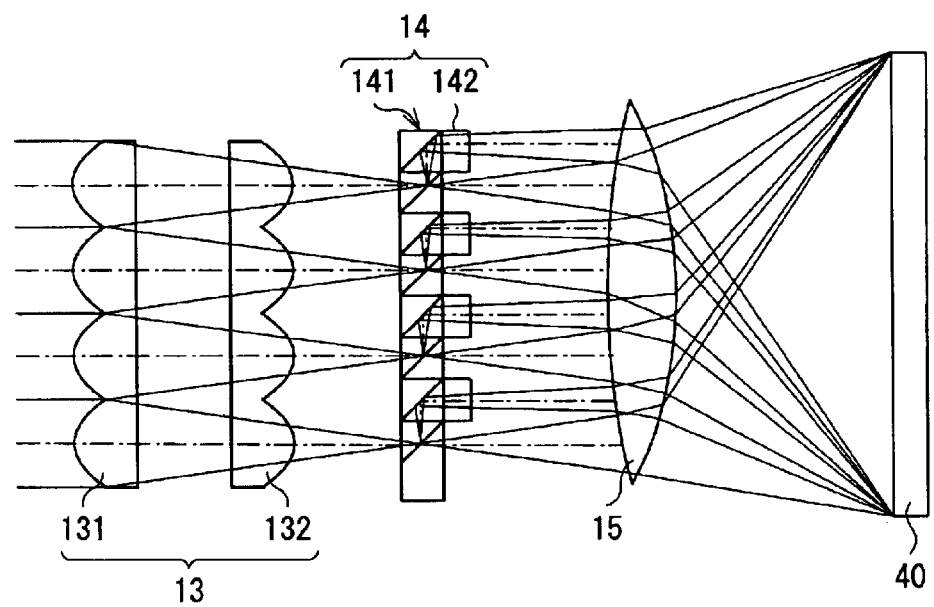
FIG. 2 is a sectional view of optical paths in a fly-eye lens portion and a polarization converting device of the projection type liquid crystal display apparatus shown in FIG. 1.
Figure 3:
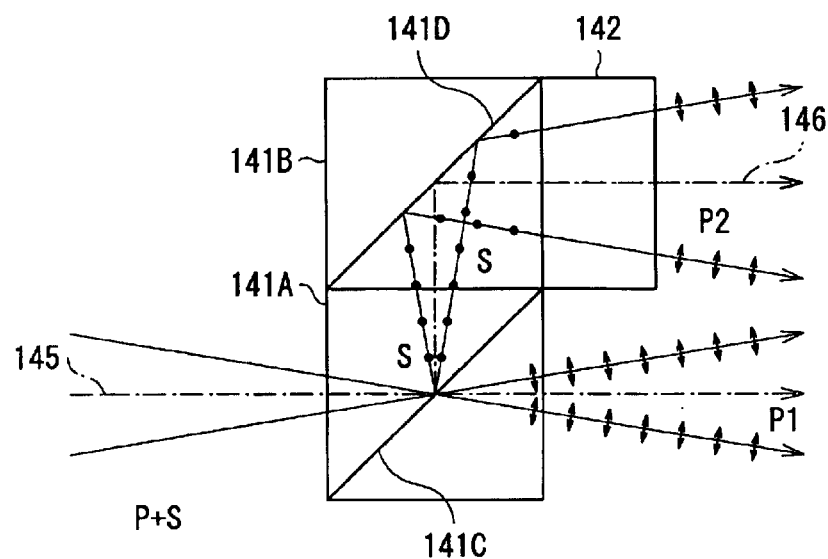
FIG. 3 is an enlarged sectional view of a part of the polarization converting device shown in FIG. 2.
Figure 4:
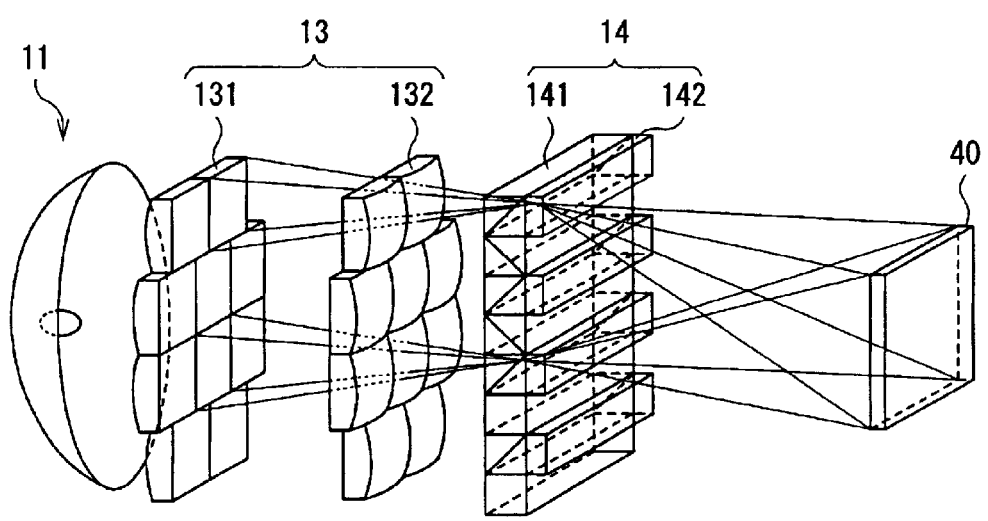
FIG. 4 is a schematic perspective view of the optical paths in the fly-eye lens portion and the polarization converting device of the projection type liquid crystal display apparatus shown in FIG. 1.

Next, referring to FIGS. 2 through 4, the structures of the fly-eye lens portion 13 and the polarization converting device 14 will be described in more detail below. FIG. 2 shows a sectional view of the fly-eye lens portion 13 and the polarization converting device 14 in FIG. 1 taken along a plane passing through the optical axis 10 and being perpendicular to a paper plane, and FIG. 3 shows an enlarged view of a part of the polarization converting device 14 shown in FIG. 2, and FIG. 4 shows a schematic perspective view of the fly-eye lens portion 13 and the polarization converting device 14. In FIGS. 2 and 3, in order to avoid mixing up a line indicating a beam path, cross-hatching is not shown. Further, in FIG. 4, components from the condenser lens 15 to the condenser lenses 38R, 38G and 38B are not shown.

As shown in FIGS. 2 and 4, the first lens array 131 which is a part of the fly-eye lens portion 13 includes a large number of minute lens elements (micro lenses) two-dimensionally aligned along a plane perpendicular to the optical axis 10, and separates luminous fluxes substantially parallel to one another from the first light source 11 into a plurality of small luminous fluxes by each lens element to condense each of them. The shape of each lens element of the first lens array 131 is similar to the shape of the liquid crystal panel 40, and the lens element and the liquid crystal panel 40 have an image conjugate relationship.

The second lens array 132 which is another part of the fly-eye lens portion 13 includes a plurality of lens elements two-dimensionally aligned corresponding to each of the lens elements of the first lens array 131. Each lens element of the second lens array 132 emits the small luminous fluxes incident from a corresponding lens element in the first lens array 131 so as to superimpose the small luminous fluxes on one another. The small luminous fluxes emitted from the lens elements of the second lens array 132 are condensed on surfaces of the liquid crystal panels 40R, 40G and 40B by the condenser lens 15, and are superimposed on one another thereon.

The polarization converting device 14 disposed at the back of the fly-eye lens portion 13 includes a PS separation prism array 141 and a phase plate 142. The PS separation prism array 141 includes PS separation prisms 141A having a strip shape and a square cross section, and reflective prisms 141B (refer to FIG. 3) which are alternately aligned. The PS separation prisms 141A and the reflective prisms 141B are formed so as to have a width equivalent to half the width of each lens element of the first and the second lens arrays 131 and 132.

The PS separation prism 141A includes two triangular prisms with a base angle of 45 degrees, of which oblique surfaces are bonded together, and the bonded surface is a PS separation surface 141C where a PS separation film is formed. The PS separation prism 141A is disposed so that the center of the PS separation prism 141A is positioned on an optical axis 145 of each lens element of the first and the second lens arrays 131 and 132. A PS polarization mixed luminous flux (P+S) emitted from the second lens array 132 comes into a focus at approximately the center on the PS separation surface 141C, and is separated into the P-polarized luminous flux P1 which travels in the same direction as the incident direction and the S-polarized luminous flux S which travels in a direction orthogonal to the incident direction.

The reflective prism 141B includes two triangular prisms with the same shape as that of the triangular prism of the PS separation prism 141A, and oblique surfaces of the triangular prisms are bonded together. The bonded surface is a reflective surface 141D where a reflective film is formed. The reflective prism 141B is disposed so that the center of the reflective prism 141B is placed in a position corresponding to a portion between the lens elements adjacent to each other in the first and the second lens arrays 131 and 132. The reflective surface 141D of the reflective prism 141B reflects the S-polarized luminous flux S reflected on the PS separation surface 141C of the PS separation prism 141A in a direction orthogonal to the incident direction while keeping the polarization direction. Thereby, a main luminous beam 146 emitted from the reflective prism 141B becomes parallel to a direction of the optical axis 145 which is a main luminous beam of the incident luminous flux (that is, a direction of the optical axis 10 in FIG. 1). The PS separation prism array 141 does not necessarily include the bonded prisms having a strip shape and a square cross section, and may include rhombic prisms with the same shape and the same size.

The phase plate 142 has a plate shape with the same size as that of an emission surface of each reflective prism 141B, and is disposed in proximity to or in contact with the emission surface of each reflective prism 141B. The phase plate 142 is also called a half-wave plate, and is made of, for example, white mica, a synthetic resin exhibiting a double refraction phenomenon or the like. The phase plate 142 causes a phase difference of half the wavelength of the incident luminous flux between electric vector components orthogonal to each other in the incident luminous flux. Thereby, the polarization direction of the S-polarized luminous flux S entered to the phase plate 142 is rotated by 90 degrees so that the S-polarized luminous flux S is emitted as a P-polarized luminous flux P2.

Consequently, almost all of the PS polarization mixed luminous fluxes (P+S) entered to the polarization converting device 14 are converted into the P-polarized luminous fluxes P1 and P2 to be emitted, so compared to a typical polarization filter removing the S-polarized component and allowing only P-polarization pass through, a energy loss during converting is extremely small.

Figure 5:
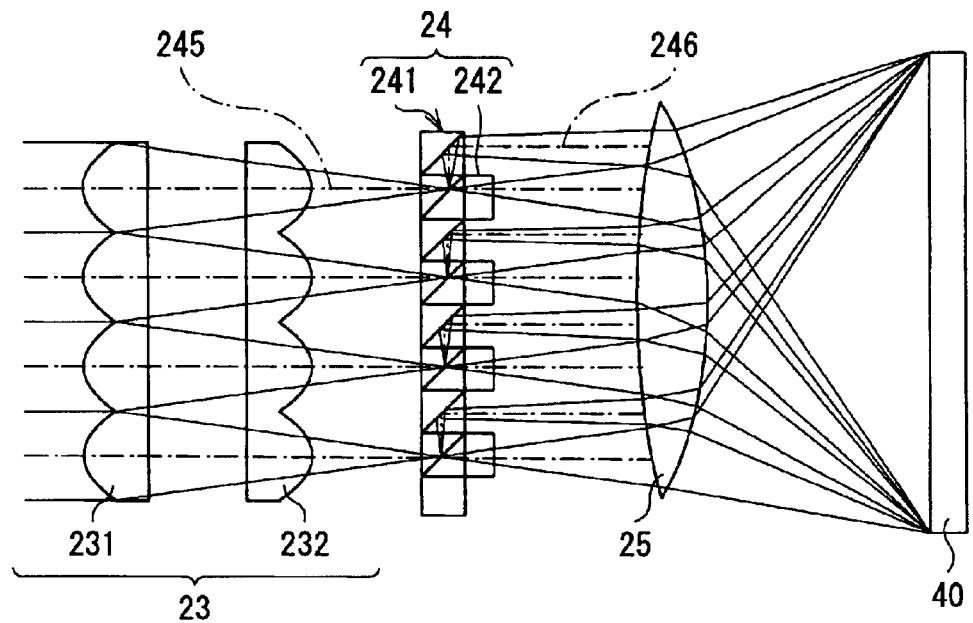
FIG. 5 is a sectional view of optical paths in another fly-eye lens portion and another polarization converting device of the projection type liquid crystal display apparatus shown in FIG. 1.
Figure 6:
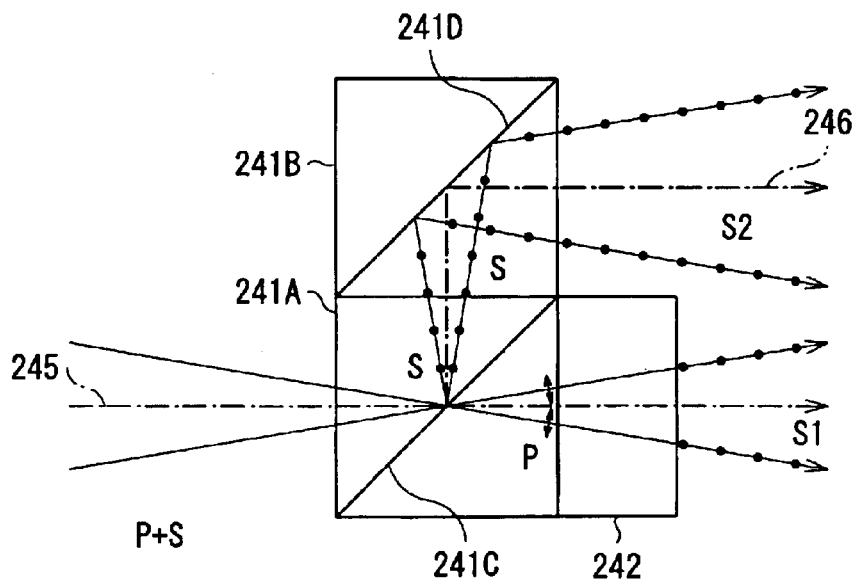
FIG. 6 is an enlarged sectional view of a part of the polarization converting device shown in FIG. 5.

Next, referring to FIGS. 5 and 6, the structures of the fly-eye lens portion 23 and the polarization converting device 24 will be described below. FIG. 5 shows a sectional view of the fly-eye lens portion 23 and the polarization converting device 24 shown in FIG. 1 taken along a plane passing through the optical axis 20 and being perpendicular to a paper plane, and FIG. 6 shows an enlarged sectional view of a part of the polarization converting device 24 shown in FIG. 5. In FIGS. 5 and 6, in order to avoid mixing up a line indicating a beam path, cross-hatching is not shown.

As shown in FIGS. 5 and 6, the structures of the fly-eye lens portion 23 and the polarization converting device 24 are substantially the same as those of the fly-eye lens portion 13 and the polarization converting device 14 shown in FIGS. 2 and 3. However, while a luminous flux emitted from the polarization converting device 14 is the P-polarized luminous flux, a luminous flux emitted from the polarization converting device 24 is the S-polarized luminous flux S.

A third lens array 231 which is a part of the fly-eye lens portion 23 includes a large number of minute lens elements which are two-dimensionally aligned, and separates luminous fluxes from the collimator lens 22 substantially parallel to one another into a plurality of small luminous fluxes by each lens element to condense each of them. The shape of each lens element of the third lens array 231 is similar to the shape of the liquid crystal panel 40, and the lens element and the liquid crystal panel 40 have an image conjugate relationship.

The fourth lens array 232 which is another part of the fly-eye lens portion 23 includes a plurality of lens elements which are two dimensionally aligned corresponding to each lens element of the third lens array 231. Each lens element of the fourth lens array 232 emits the small luminous fluxes incident from a corresponding lens element in the third lens array 231 so as to superimpose the small luminous fluxes on one another. The small luminous fluxes emitted from the lens elements of the fourth lens array 232 are condensed on surfaces of the liquid crystal panels 40R, 40G and 40R by a condenser lens 25, and are superimposed on one another thereon.

The polarization converting device 24 disposed at the back of the fly-eye lens portion 23 includes a PS separation prism array 241 and a phase plate 242. The PS separation prism array 241 includes PS separation prisms 241A having a strip shape and a square cross section and reflective prisms 241B (refer to FIG. 6) which are alternately aligned. The PS separation prisms 241A and the reflective prisms 241B are formed so as to have a width equivalent to half the width of each lens element of the third and the fourth lens arrays 231 and 232.

The PS separation prism 241A includes two triangular prisms with a base angle of 45 degrees, of which oblique surfaces are bonded together, and the bonded surface is a PS separation surface 241C where a PS separation film is formed. The PS separation prism 241A is positioned on an optical axis 245 of each lens element of the third and the fourth lens arrays 231 and 232. A PS polarization mixed luminous flux (P+S) emitted from the fourth lens array 232 comes into a focus at approximately the center on the PS separation surface 241C, and is separated into the P-polarized luminous flux P which travels in the same direction as the incident direction and the S-polarized luminous flux S which travels in a direction orthogonal to the incident direction.

The phase plate 242 has a plate shape with the same size as that of an emission surface of each PS separation prism 241A, and is disposed in proximity to or in contact with the emission surface of each PS separation prism 241A. The polarization direction of the P-polarized luminous flux entered to the phase plate 242 is rotated by 90 degrees so that the P-polarized luminous flux is emitted as a S-polarized luminous flux S1.

The reflective prism 241B reflects the S-polarized luminous flux S reflected on the PS separation surface 241C by the reflective surface 241D in a direction orthogonal to the incident direction while keeping the polarization direction. Thereby, a main luminous beam 246 of the S-polarized luminous flux S2 emitted from the reflective prism 241B becomes parallel to a direction of the optical axis 245 which is a main luminous beam of the incident luminous flux (that is, a direction of the optical axis 20 in FIG. 1).

Next, actions and functions of the liquid crystal display apparatus according to the embodiment will be described below.

At first, referring to FIG. 1, actions of the whole display apparatus according to the embodiment will be described below.

In the first optical system 1, a luminous flux L1 emitted from the first light source 11 passes through the fly-eye lens portion 13, the polarization converting device 14, the condenser lens 15, the PS separation/synthesis device 16, the polarization rotating device 17 and the polarizing plate 18 in order, and travels toward the second optical system 2 disposed next to the first optical system 1. On the other hand, a luminous flux L2 emitted from the second light source 21 passes through the collimator lens 22, the fly-eye lens portion 23, the polarization converting device 24, the condenser lens 25, the PS separation/synthesis device 16, the polarization rotating device 17 and the polarizing plate 18 in order, and travels toward the second optical system 2. In this case, the luminous fluxes L1 and L2 having passed through the polarizing plate 18 become a mixed luminous flux (L1+L2). Functions of the first optical system 1 will be described later.

The mixed luminous flux (L1+L2) having passed through the polarizing plate 18 of the first optical system 1 enters into the dichroic mirrors 36R and 36G (refer to FIG. 1) of the second optical system 2 in order. The dichroic mirror 36R separates a red component light from the mixed luminous flux (L1+L2), and reflects the red component light in a direction orthogonal to the incident direction. The dichroic mirror 36G separates a green component light from the mixed luminous flux (L1+L2) having passed through the dichroic mirror 36R, and reflects the green component light in a direction orthogonal to the incident direction. A blue component light having passed through the dichroic mirror 36G passes through the condenser lens 32, and is reflected in a direction orthogonal to the incident direction by the reflective mirror 37A.

After the red component light reflected on the dichroic mirror 36R is reflected in a direction orthogonal to the incident direction by the reflective mirror 37C, the red component light passes through the condenser lens 38R, and enters to the liquid crystal panel 40R. The green component light reflected on the dichroic mirror 36G passes through the condenser lens 38G, and enters to the liquid crystal panel 40G. The blue component light reflected on the reflective mirror 37A further passes through the condenser lens 33, and is reflected in a direction orthogonal to the incident direction by the reflective mirror 37B, and passes through the condenser lens 38B, then enters to the liquid crystal panel 40B.

The liquid crystal panels 40R, 40G and 40B rotate the polarization directions of the color component lights of R (red), G (green) and B (blue), respectively, according to a color image signal, and emit the color component lights. After the intensity of each color component light emitted from each of the liquid crystal panels 40R, 40G and 40B is modulated by a polarizing plate (not shown), each color component light enters to the dichroic prism for color synthesis 42 from a different side surface for each color. In the dichroic prism for color synthesis 42, the red component light, the green component light and the blue component light are synthesized, and the synthesized light is emitted to be projected on the screen 31 by the projection lens 43.

The shape of each lens element of the first and the third lens arrays 131 and 231 is similar to the shape of the liquid crystal panel 40, and they have a image conjugate relationship. Therefore, as shown in FIGS. 2 and 5, each small luminous flux having passed through each lens element of the first and the third lens arrays 131 and 231 is magnified and projected on the liquid crystal panel 40, and is superimposed thereon. Thereby, even if the intensity distribution in the cross section of the luminous flux is not uniform before the luminous flux enters to the first and the third lens arrays 131 and 231, the illuminance distribution on the liquid crystal panel 40 becomes sufficiently uniform.

Figure 8A:
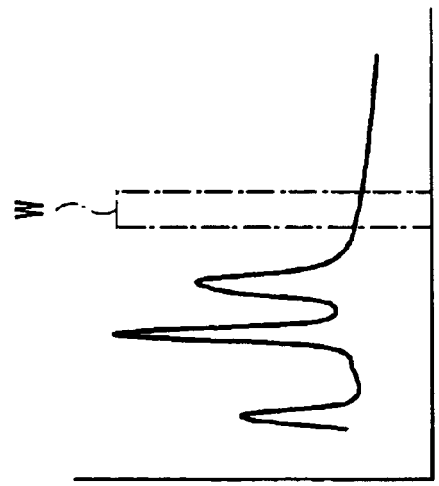
FIGS. 8A through 8C are plots of the wavelength spectrum of a luminous flux passing through the projection type liquid crystal display apparatus shown in FIG. 1.
Figure 8B:
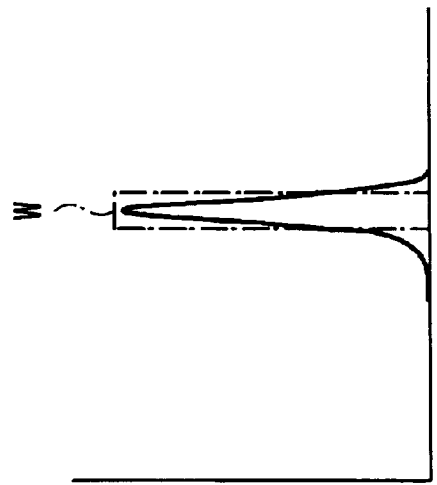
Figure 8C:
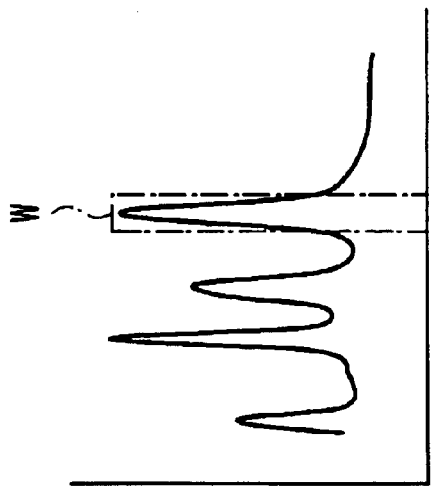
Figure 10:
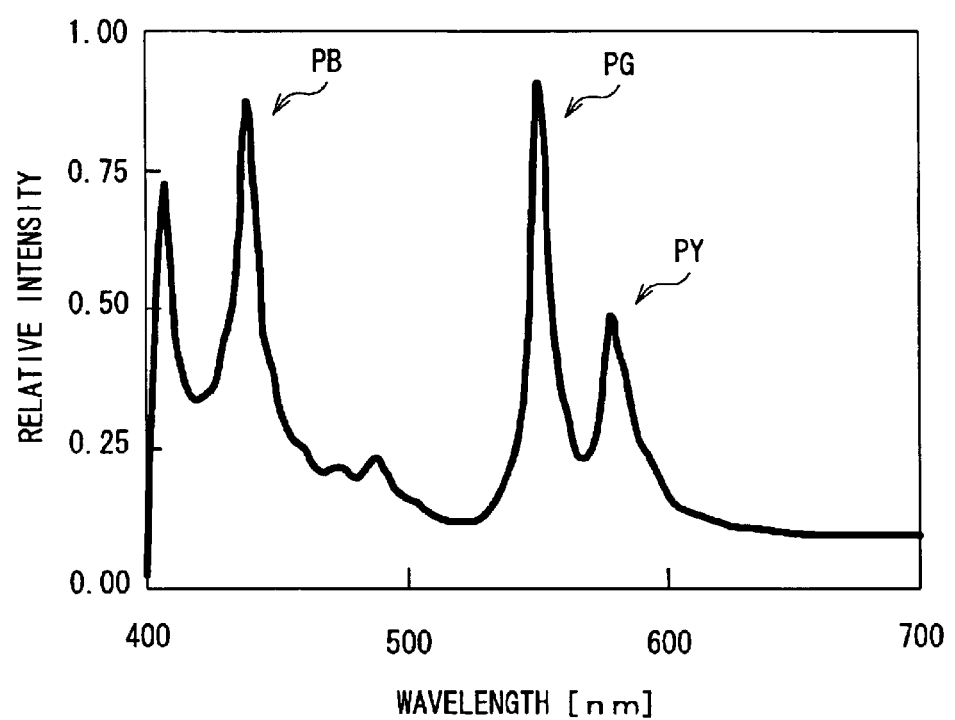
FIG. 10 is a plot of an emission spectrum in a typical super high pressure mercury lamp.

Next, referring to FIGS. 1 through 8C, the functions of the first optical system 1 as the illumination optical system according to the embodiment will be described in detail below. FIGS. 7A and 7B is schematic sectional views showing the polarization directions of the luminous flux L1 and the luminous flux L2 when the luminous fluxes L1 and L2 pass through the PS separation/synthesis device 16, the polarization rotating device 17 and the polarizing plate 18. FIGS. 8A through 8C are plots of emission spectrums in a predetermined position in the illumination optical system according to the embodiment. In FIGS. 1, 3, 5, 7A and 7B, the polarization direction of P-polarization (in a paper plane) is indicated with a "double-headed arrow", and the polarization direction of S-polarization (perpendicular to the paper plane) is indicated with "●".

At first, referring to FIGS. 1 through 6, functions from the first light source 11 to the PS separation/synthesis device 16, and functions from the second light source 21 to the PS separation/synthesis device 16 will be described below.

The first light source 11 emits the luminous flux L1 substantially parallel to the optical axis 10. The luminous flux L1 is a PS polarization mixed luminous flux including the P-polarized component and the S-polarized component. The luminous flux L1 enters into the first lens array 131 of the fly-eye lens portion 13, and is separated into a plurality of small luminous fluxes by each lens element (refer to FIG. 2). Each of the small luminous fluxes passes through the proximity of the center of each corresponding lens element in the second lens array 132, and the small luminous fluxes enter into the polarization converting device 14 while condensing. In the polarization converting device 14, almost all of the small luminous fluxes separated from the luminous flux L1 which is the PS polarization mixed luminous flux is converted into the P-polarized luminous fluxes, and the P-polarized luminous fluxes enter into the condenser lens 15 while diverging (refer to FIG. 3). The P-polarized luminous fluxes having passed through the polarization converting device 14 are converted into substantially telecentric luminous fluxes by the condenser lens 15 to enter into the PS separation/synthesis device 16.

The luminous flux L2 emitted from the second light source 21 enters into the collimator lens 22 while diverging. The collimator lens 22 converts the luminous flux L2 into a luminous flux substantially parallel to the optical axis 20, and emits the luminous flux L2. The luminous flux L2 is a PS polarization mixed luminous flux including the P-polarized component and the S-polarized component. The luminous flux L2 enters into the third lens array 231 of the fly-eye lens portion 23, and is separated into a plurality of small luminous fluxes by each lens element (refer to FIG. 5). Each of the small luminous fluxes passes through the proximity of the center of each corresponding lens element in the fourth lens array 232, and enters into the polarization converting device 24 while condensing. In the polarization converting device 24, almost all of the small luminous fluxes separated from the luminous flux L2 which is the PS polarization mixed luminous flux are converted into the S-polarized luminous fluxes, and the S-polarized luminous fluxes enter into the condenser lens 25 while diverging (refer to FIG. 6). The P-polarized luminous fluxes having passed through the polarization converting device 24 are converted into substantially telecentric luminous fluxes by the condenser lens 25 to enter into the PS separation/synthesis device 16.

Next, referring to FIGS. 7A through 8C, functions of the PS separation/synthesis device 16, the polarization rotating device 17 and the polarizing plate 18 which are characteristic portions of the invention will be described in detail below.

FIG. 7A shows the polarization direction of the luminous flux L1, and FIG. 7B shows the polarization direction of the luminous flux L2.

As shown in FIG. 7A, almost all of the small luminous fluxes in the luminous flux L1 which enter into the PS separation/synthesis device 16 are the P-polarized luminous fluxes. The P-polarized luminous fluxes in the luminous flux L1 pass through the separation/synthesis surface 16A with hardly any loss, and the P-polarized luminous fluxes are emitted from the PS separation/synthesis device 16 to enter the polarization rotating device 17. A few S-polarized luminous fluxes in the luminous flux L1 entering into the PS separation/synthesis device 16 are reflected on the separation/synthesis surface 16A in a direction orthogonal to the incident direction (that is, a direction orthogonal to the optical axis 10) to be removed. In the polarization rotating device 17, the polarization direction of only the red component light corresponding to a waveband ranging from 620 nm to 700 nm is selectively rotated by 90 degrees. Therefore, the luminous flux L1 emitted from the polarization rotating device 17 is a PS polarization mixed luminous flux including the S-polarized luminous flux which is the red component light and the P-polarized luminous flux which is a color component light except for red. However, the S-polarized luminous flux is blocked by the polarizing plate 18, so the luminous flux L1 having passed through the polarizing plate 18 is the P-polarized luminous flux. In other words, the luminous flux L1 emitted from the first light source 11 becomes the P-polarized luminous flux from which the red component light is removed.

On the other hand, as shown in FIG. 7B, almost all of the small luminous fluxes in the luminous flux L2 which enter into the PS separation/synthesis device 16 are the S-polarized luminous fluxes. The S-polarized luminous fluxes in the luminous flux L2 are reflected on the separation/synthesis surface 16A in a direction orthogonal to the incident direction (that is, a direction parallel to the optical axis 10) with hardly any loss, and are emitted from the PS separation/synthesis device 16 to enter into the polarization rotating device 17. A few P-polarized luminous fluxes in the luminous flux L2 entering into the PS separation/synthesis device 16 pass through the separation/synthesis surface 16A to be removed. In the polarization rotating device 17, the polarization direction of the red component light corresponding to a waveband ranging from 620 nm to 700 nm is rotated by 90 degrees. Therefore, almost all of the small luminous fluxes in the luminous flux L2 which are emitted from the polarization rotating device 17 become the P-polarized luminous fluxes, and the P-polarized luminous fluxes pass through the polarizing plate 18 disposed next to the polarization rotating device 17. In other words, the luminous flux L2 emitted from the second light source 21 becomes the P-polarized luminous flux formed of the red component light.

In the emission spectrums shown in FIGS. 8A through 8C, the horizontal axis indicates wavelength and the vertical axis indicates light-emitting intensity. FIG. 8A shows a wavelength spectrum of the luminous flux L1 from the first light source 11, FIG. 8B shows a wavelength spectrum of the luminous flux L2 from the second light source 21, and FIG. 8C shows a wavelength spectrum of the mixed luminous flux (L1+L2) including the luminous flux L1 and the luminous flux L2 after passing through the polarizing plate 18. In FIGS. 8A through 8C, the range of a waveband W corresponds to a range of 620 nm to 700 nm.

As shown in FIG. 8A, in the wavelength spectrum of the luminous flux L1 from the first light source 11, the light-emitting intensity of the red waveband W is relatively low, so the red component light is insufficient. On the other hand, the wavelength spectrum of the luminous flux L2 from the second light source 21 is the red component light having a light-emitting peak in the red waveband W as shown in FIG. 8B. Further, as shown in FIG. 8C, the wavelength spectrum of the mixed luminous flux (L1+L2) including the luminous flux L1 and the luminous flux L2 after passing through the polarizing plate 18 has a wavelength spectrum with a shape in which the wavelength spectrum in the red waveband W in FIG. 8A is replaced with the wavelength spectrum in the red waveband W in FIG. 8B. In other words, the red component light which is insufficient in the luminous flux L1 from the first light source 11 is replaced with the luminous flux L2 with sufficient intensity from the second light source 21 so as to keep an excellent intensity balance among color component lights of R (red), G (green) and B (blue).

As described above, in the illumination optical system and the liquid crystal display apparatus according to the embodiment, the wavelength spectrum in the red waveband W corresponding to the red component light in the first light source 11 which is a super high pressure mercury lamp is replaced with the wavelength spectrum in the red waveband W in the second light source 21 which is a red LED, so a superior intensity balance among the color component lights of R (red), G (green) and B (blue) can be obtained without reducing the component lights of G (green) and B (blue), and superior color rendering properties can be exhibited.

More specifically, after the luminous flux L1 and the luminous flux L2 are mixed in the PS separation/synthesis device 16, the polarization direction of a specific waveband in the luminous flux L1 and the polarization direction of the specific waveband in the luminous flux L2 are rotated by the same polarization rotating device 17, so the waveband removed from the luminous flux L1 and the waveband of the luminous flux L2 with which the removed waveband is replaced perfectly coincide with each other. Therefore, the replacement with a desired waveband can be accurately and easily carried out.

Moreover, as the red waveband W can have a sufficiently strong peak, an adverse effect on the color rendering properties which a peak of a yellow light component or an orange light component in a waveband ranging around 580 nm causes can be reduced to a practically insignificant extent.

The present invention is described referring to the embodiment, but the invention is not limited to the above embodiment, and is variously modified. For example, in the embodiment, the fly-eye lens portions 13 and 23 and polarization converting devices 14 and 24 are disposed in order from the first and the second light sources 11 and 21, respectively, but the order is not specifically limited. They may be disposed in reverse order, or the fly-eye lens portions 13 and 23 may be removed.

Moreover, in the embodiment, the liquid crystal panels 40R, 40G and 40B are used as the spatial modulation devices, but the invention is not limited to this. A device in which a pixel is made of a minute mirror such as DMD (digital micromirror device) may be used.

Further, in the embodiment, the polarization rotating device 17 is a polarization rotating device having such wavelength selectivity that the polarization direction of only light in the above-described specific waveband (red waveband W) in the incident luminous flux is rotated by 90 degrees, and light in the other waveband passes through without rotation, and only a linearly polarized luminous flux in the first polarization direction. (P-polarization direction) in a linearly polarized luminous flux emitted from the polarization rotating device 17 passes through the polarizing plate 18. However, conversely, as shown in FIGS. 9A and 9B, a polarization rotating device 170 may be a polarization rotating device with such wavelength selectivity that light in the above-described waveband (red waveband W) in the incident luminous flux passes through without rotation and the polarization direction of only light in the other waveband in the incident luminous flux is rotated by 90 degrees, and only a linearly polarized luminous flux in the second polarization direction (S-polarization direction) in the linearly polarized luminous flux emitted from the polarization rotating device 170 may pass through a polarizing plate 180. Thereby, not only the linearly polarized luminous flux in the first polarization direction (P-polarization direction) but also the linearly polarized luminous flux in the second polarization direction (S-polarization direction) as an output of the polarizing plate 180 can be used as illumination light.

Further, in the embodiment, the specific waveband is the red waveband W, and the super high pressure mercury lamp having an insufficient red component light is used as the first light source 11, and the red LED including many red components is used as the second light source 21, thereby the replacement of the red component light is carried out, but the invention is not limited to this, and the replacement of any other color component light may be carried out. For example, when a lamp having an insufficient blue component light is used as the first light source 11, a blue LED or the like may be used as the second light source 21. In this case, a selected wavelength range of the polarization rotating device 17 may be set to a desired range (in this case, a range corresponding to a blue waveband). Each of the first light source 11 and the second light source 21 may be any other kind of light source. Further, the polarization converting devices 14 and 24 may be simple polarization filters.

Moreover, the above-described specific waveband may include a part or all of the peak waveband of the yellow light component or the orange light component in a waveband around 580 nm in addition to the red waveband, and the above red waveband in the luminous flux L1 may be replaced with the luminous flux L2, and light in a part or all of the waveband of the yellow component light or the orange component light may be removed.

As described above, the illumination optical system or the image display apparatus according to the invention comprises the first light source, the second light source having a different emission spectrum from the emission spectrum of the first light source, and the replacement optical system replacing light in a specific waveband in the luminous flux from the first light source with the luminous flux from the second light source, so the light in the specific waveband with weak light intensity in the luminous flux from the first light source can be replaced with the luminous flux with sufficient intensity from the second light source. Therefore, a white balance can be kept without reducing illuminance more than necessary, and superior color rendering properties can be exhibited.

Moreover, in the illumination optical system according to the invention, the luminous flux from the second light source has an intensity peak in the specific waveband, so while maintaining higher illuminance, superior color rendering properties can be exhibited.

In the illumination optical system according to the invention, the replacement optical system includes the first polarization converting device converting the luminous flux from the first light source into the first linearly polarized luminous flux polarized in the first polarization direction, the second polarization converting device converting the luminous flux from the second light source into the second linearly polarized flux polarized in the second polarization direction orthogonal to the first polarization direction, the light synthesis device synthesizing the first linearly polarized luminous flux and the second linearly polarized luminous flux, the polarization rotating device selectively rotating the polarization direction of only light in a specific waveband in the luminous flux emitted from the first polarization converting device from the first polarization direction to the second polarization direction, and rotating the polarization direction of the luminous flux emitted from the second polarization converting device from the second polarization direction to the first polarization direction, and the polarizing device allowing only the linearly polarized luminous flux in the first polarization direction in the luminous flux emitted from the polarization rotating device pass through, so the waveband removed from the luminous flux and the waveband of the luminous flux with which the removed waveband is replaced perfectly coincide with each other. Therefore, a replacement with a desired waveband can be easily and accurately carried out, and superior color rendering properties can be exhibited without losing the light intensity from the first light source.

Moreover, in the illumination optical system according to the invention, the first uniformization optical system for making the light intensity distribution uniform is included between the first light source and the replacement optical system, so the illuminance distribution in a projected image finally obtained can be made more uniform.

Further, in the illumination optical system according to the invention, the second uniformization optical system for making the light intensity distribution uniform is included between the second light source and the replacement optical system, so the illuimnance distribution in a projected image finally obtained can be made more uniform.

Still further, in the illumination optical system according to the invention, the specific waveband is the red waveband, and the second light source is a light-emitting diode or a red laser showing the light intensity distribution in the red waveband, so when a light source having an insufficient red component light such as a super high pressure mercury lamp or the like is used as the first light source, a replacement with the red component light in the second light source can be carried out. Specifically, the red waveband in the second light source has a peak, so even if a color component light other than R (red), G (green) and B (blue) such as the yellow component light, the orange component light or the like is included, superior color rendering properties can be exhibited without adverse effect by such an unnecessary component light.

A method of illuminating the spatial modulation device according to the invention comprises the steps of emitting a luminous flux from the first light source, emitting a luminous flux emitted from the second light source with a different emission spectrum from the emission spectrum of the first light source, replacing light in a specific waveband in the luminous flux from the first light source with the luminous flux from the second light source, and guiding the luminous flux from the first light source in a state where the light in the specific waveband is replaced with the luminous flux from the second light source to the spatial modulation device. Thereby, light in the specific waveband with weak light intensity in the luminous flux from the first light source can be replaced with the luminous flux with sufficient intensity from the second light source. Therefore, a white balance can be kept without reducing the illuminance more than necessary, and superior color rendering properties can be exhibited.

What is claimed is:

1. An illumination optical system, comprising:
a first light source;
a second light source having a different emission spectrum from an emission spectrum of the first light source; and
a replacement optical system replacing light in a specific waveband in a luminous flux from the first light source with a luminous flux from the second light source,
wherein the replacement optical system includes:
a light synthesis device synthesizing and emitting a luminous flux incident from the first light source as a first linearly polarized luminous flux polarized in a first polarization direction and a luminous flux incident from the second light source as a second linearly polarized luminous flux polarized in a second polarization direction,
a polarization rotating device selectively rotating only light polarized in the first polarization direction in the specific waveband in the luminous flux emitted from the light synthesis device to the second polarization direction and selectively rotating only light polarized in the second polarization direction in the specific waveband in the luminous flux emitted from the light synthesis device to the first polarization direction, and a polarizing device allowing only a linearly polarized luminous flux in the first polarization direction in the luminous flux emitted from the polarization rotating device pass through.

2. An illumination optical system according to claim 1, wherein the replacement optical system further includes a first polarization means emitting a randomly polarized luminous flux emitted from the first light source as the first linearly polarized flux polarized in the first polarization direction, and the light synthesis device synthesizes and emits the luminous flux incident from the first light source through the first polarization means as the first linearly polarized luminous flux and the luminous flux incident from the second light source as the second linearly polarized luminous flux polarized in the second polarization direction.

3. An illumination optical system, comprising:

a first light source;

a second light source having a different emission spectrum from an emission spectrum of the first light source; and a replacement optical system replacing light in a specific waveband in a luminous flux from the first light source with a luminous flux from the second light source, wherein the replacement optical system includes:
  a light synthesis device synthesizing and emitting a luminous flux incident from the first light source as a first linearly polarized luminous flux polarized in the first polarization direction and a luminous flux incident from the second light source as a second linearly polarized luminous flux polarized in a second polarization direction;
  a polarization rotating device selectively rotating only light polarized in the first polarization direction in a waveband other than the specific waveband in the luminous flux emitted from the light synthesis device to the second polarization direction and selectively rotating only light polarized in the second polarization direction in a waveband other than the specific waveband in the luminous flux emitted from the light synthesis device to the first polarization direction; and
  a polarizing device allowing only a linearly polarized luminous flux in the second polarization direction in the luminous flux emitted from the polarization rotating device pass through.

4. An illumination optical system according to claim 3, wherein the replacement optical system further includes a first polarization means emitting a randomly polarized luminous flux emitted from the first light source as the first linearly polarized flux polarized in the first polarization direction, and the light synthesis device synthesizes and emits the luminous flux incident from the first light source through the first polarization means as the first linearly polarized luminous flux and the luminous flux incident from the second light source as the second linearly polarized luminous flux polarized in the second polarization direction.

5. An illumination optical system, comprising:

a first light source;

a second light source having a different emission spectrum from an emission spectrum of the first light source; and a replacement optical system replacing light in a specific waveband in a luminous flux from the first light source with a luminous flux from the second light source, wherein the replacement optical system includes:
  a first polarization converting device converting a luminous flux from the first light source into a first linearly polarized luminous flux polarized in a first polarization direction, a second polarization converting device converting a luminous flux from the second light source into a second linearly polarized luminous flux polarized in a second polarization direction orthogonal to the first polarization direction;
  a light synthesis device synthesizing the first linearly polarized luminous flux and the second linearly polarized luminous flux;
  a polarization rotating device selectively rotating the polarization direction of only light in the specific waveband in the luminous flux emitted from the first polarization converting device from the first polarization direction to the second polarization direction, and rotating the polarization direction of the luminous flux emitted from the second polarization converting device from the second polarization direction to the first polarization direction; and
  a polarizing device allowing only a linearly polarized luminous flux in the first polarization direction in the luminous flux emitted from the polarization rotating device pass through.

6. An illumination optical system, comprising:

a first light source;

a second light source having a different emission spectrum from an emission spectrum of the first light source; and a replacement optical system replacing light in a specific waveband in a luminous flux from the first light source with a luminous flux from the second light source, wherein the replacement optical system includes:
  a first polarization converting device converting a luminous flux from the first light source into a first linearly polarized luminous flux polarized in a first polarization direction;
  a second polarization converting device converting a luminous flux from the second light source into a second linearly polarized luminous flux polarized in a second polarization direction orthogonal to the first polarization direction;
  a light synthesis device synthesizing the first linearly polarized luminous flux and the second linearly polarized luminous flux;
  a polarization rotating device selectively rotating the polarization direction of only light in a waveband other than the specific waveband in the luminous flux emitted from the first polarization converting device from the first polarization direction to the second polarization direction, and rotating the polarization direction of the luminous flux emitted from the second polarization converting device from the second polarization direction to the first polarization direction; and
  a polarizing device allowing only a linearly polarized luminous flux in the second polarization direction in the luminous flux emitted from the polarization rotating device pass through.

* * * * *